(12) United States Patent
Weinstein et al.

(10) Patent No.: US 6,929,839 B2
(45) Date of Patent: *Aug. 16, 2005

(54) PRE-CUT FIBROUS INSULATION FOR CUSTOM FITTING WALL CAVITIES OF DIFFERENT WIDTHS

(75) Inventors: Larry J. Weinstein, Littleton, CO (US); Robert J. Allwein, Highlands Ranch, CO (US)

(73) Assignee: Johns Manville International, Inc., Denver, CO (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/378,439

(22) Filed: Mar. 3, 2003

(65) Prior Publication Data

US 2003/0148686 A1 Aug. 7, 2003

Related U.S. Application Data (60) Continuation of application No. 10/011,851, filed on Nov. 28, 2001, now Pat. No. 6,551,677, which is a continuation of application No. 09/770,040, filed on Jan. 24, 2001, now Pat. No. 6,670,011, which is a continuation-in-part of application No. 09/713,354, filed on Nov. 10, 2000, now abandoned, which is a continuation-in-part of application No. 09/522,976, filed on Mar. 10, 2000, now Pat. No. 6,165,305, which is a division of application No. 09/167,783, filed on Oct. 7, 1998, now Pat. No. 6,083,594.

(51) Int. Cl.[7] ................................................. B32B 3/10
(52) U.S. Cl. ........................ 428/43; 428/124; 428/126; 428/129; 428/130
(58) Field of Search ........................ 428/43, 124, 126, 428/130, 129; 52/98, 404.1, 406.1

(56) References Cited

U.S. PATENT DOCUMENTS

| | | | | |
|---|---|---|---|---|
| 6,383,594 B2 | * | 5/2002 | Weinstein et al. | 428/43 |
| 6,468,615 B2 | * | 10/2002 | Weinstein et al. | 428/43 |
| 6,551,677 B2 | * | 4/2003 | Weinstein et al. | 428/43 |
| 6,670,011 B2 | * | 12/2003 | Weinstein et al. | 428/43 |
| 6,740,188 B2 | * | 5/2004 | Allwein et al. | 156/250 |

* cited by examiner

*Primary Examiner*—Alexander S. Thomas
(74) *Attorney, Agent, or Firm*—Robert D. Touslee; Timothy G. Hofmeyer (57) ABSTRACT

An elongated fibrous insulation blanket is pre-cut for custom fitting the insulation blanket into wall, floor, ceiling and roof cavities of different widths formed by the framework of a building. The blanket has at least one, preferably two or three, series of cuts extending between major surfaces of the blanket with successive cuts of each series of cuts being separated by a series of separable connectors located intermediate the major surfaces of the blanket. Each series of separable connectors hold together adjacent sections of the blanket for handling, but are separable by hand so that the blanket can be handled as a unit for insulating a cavity having a predetermined width or easily separated by hand into two or more sections at one or more of the series of separable connectors for insulating a cavity having a lesser width. Either major surface of the blanket may have a facing bonded thereto with one or more perforated lines or overlapping tabs in the facing permitting the facing to be separated by hand at each series of cuts and separable connectors. Preferably, the perforations of any perforated line(s) in the facing are closed by the bonding agent bonding the facing to the blanket so that the facing functions as a vapor barrier in spite of the perforations.

8 Claims, 4 Drawing Sheets

PRE-CUT FIBROUS INSULATION FOR CUSTOM FITTING WALL CAVITIES OF DIFFERENT WIDTHS

This patent application is a continuation of application Ser. No. 10/011,851, filed on Nov. 28, 2001, now Pat. No. 6,551,677, which is a continuation of application Ser. No. 09/770,040, filed Jan. 24, 2001, now Pat. No. 6,670,011, which is a continuation-in-part of application Ser. No. 09/713,354, filed on Nov. 10, 2000, now abandoned, which is a continuation-in-part of application Ser. No. 09/522,976, filed on Mar. 10, 2000, now Pat. No. 6,165,305, which is a division of application Ser. No. 09/167,783, filed on Oct. 7, 1998, now Pat. No. 6,083,594.

BACKGROUND OF THE INVENTION

The present invention relates to a fibrous insulation blanket pre-cut for custom fitting the fibrous insulation blanket into cavities of different widths formed by the framework of a building, such as both standard and non-standard width wall, floor, ceiling or roof cavities formed in part by successive frame members; and, in particular, to a pre-cut fibrous insulation blanket that can be handled as a unit when insulating a cavity of a certain predetermined width or easily separated or torn apart (by hand) along one or more series of cuts and separable connectors formed in the fibrous insulation blanket to form narrower blankets when insulating a cavity having a lesser width.

Building structures, such as residential houses, industrial buildings, office buildings, mobile homes, prefabricated buildings and similar structures typically include walls (both interior and exterior), ceilings, floors and roofs which are insulated for both thermal and acoustical purposes, especially the exterior walls, the ceilings below open attic spaces, and the roofs of such structures. The walls, ceilings, floors and roofs of these structures include framing members, e.g. studs, rafters, floor and ceiling joists, beams and similar support members, which are normally spaced-apart standard distances established by the building industry. Sheathing, paneling, lathing or similar construction materials are secured to these framing members to form the walls, ceilings, floors and roofs of the structures. While the contractor seeks to maintain the spacing of such framing members in these structures at these standard distances for ease of construction and the insulation of the elongated cavities formed in these walls, ceilings, floors, and roofs, frequently, the walls, ceilings, floors and/or roofs of these structures include elongated cavities defined, at least in part, by successive or adjacent framing members which are spaced apart a nonstandard distance less than the standard spacing between framing members. Studies have shown that in a typical residential house, it is common for 50% or more of the framing members in the exterior walls of these structures to be spaced apart at nonstandard distances less than the standard spacing for such framing members.

When insulating these elongated cavities of various non-standard widths, less than a standard width, it has been the practice to take an insulation batt preformed to fit the standard cavity width and reduce the width of the insulation batt by cutting off and removing a strip of insulation material from one or both longitudinal edges of the insulation batt. U.S. Pat. No. 5,331,787; issued Jul. 26, 1994; to Kaarst; illustrates this approach. In the invention of this patent, the insulation batts or panels have widths at least equal to a predetermined maximum distance between adjacent support members defining the cavities that the batts or panels are to insulate. The batts or panels are provided with facings that are folded over along the longitudinal edges of the batts or panels so that strips of insulation material can be cut away from one or both longitudinal edges of the batts or panels to fit the batts or panels between support members spaced apart less than the predetermined maximum spacing. This method of trimming the insulation batts at the job site by cutting the batts to fit between the more closely spaced support members is time consuming, raises a significant risk or safety issue, relies heavily on the worker's skill to accurately trim the batt or panel.

U.S. Pat. No. 4,866,905; issued Sep. 19, 1989; to Bihy et al; discloses another approach to the problem. In the invention disclosed in this patent, a continuous strip of fibrous insulation with transverse marking lines is provided. The worker cuts the strip of fibrous insulation at the job site to a width somewhat greater than the spacing between the framing members, i.e. rafters, defining the space to be insulated. Of course this method of forming insulation batts or panels at the job site is also time consuming and relies heavily on the skill of the worker cutting the insulation strip to achieve a good result.

A different approach to the problem is shown in U.S. Pat. No. 2,335,968; issued Dec. 7, 1943; to Sawtell. In the invention of this patent, the lateral edges of the insulation blanket are turned down to enable the insulation batt to be placed between framing members, i.e. rafters, spaced closer together than the width of the insulation batt. This approach does not require any cutting or trimming at the job site, but it can only be used where the spacing between the framing members is slightly less than the width of insulation blanket. In addition, the extra insulation material used to insulate cavities having less than a standard cavity width would add significantly to material costs.

Thus it can be seen that there has been a need to provide fibrous insulation blankets or batts which can be used to either insulate cavities of a predetermined width, such as but not limited to standard width framework cavities, or be quickly and easily reduced in width to fit cavities of lesser widths, such as less than standard width cavities, without a need to cut the fibrous insulation blankets at the job site with knives or similar cutting tools which is both time consuming and can result in cuts or other injuries to the workers.

SUMMARY OF THE INVENTION

The pre-cut fibrous insulation blanket of the present invention provides a solution to the above discussed problems. The pre-cut fibrous insulation blanket of the present invention is pre-cut for custom fitting the insulation blanket into building cavities of different widths formed by the framework of a building. The width of the pre-cut fibrous insulation blanket is normally equal to or substantially equal to the width of a standard cavity to be insulated by the pre-cut fibrous insulation blanket, e.g. about fourteen and one half to about fifteen inches or about twenty two and one half to about twenty three inches in width for a typical wall cavity. However, the pre-cut fibrous insulation blanket may also be initially formed at a selected width, e.g. about thirteen to about thirteen and one half inches, less than a standard cavity width.

Do to the compressibility and resilience of the pre-cut fibrous insulation blankets of the present invention (generally pre-cut glass fiber insulation blankets), the pre-cut fibrous insulation blankets can be fitted into cavities having a width up to about one and one half inches less than the width of the pre-cut fibrous insulation blankets without removing any sections of the blankets, e.g. a pre-cut fibrous insulation blanket having a width between about fourteen and one half to about fifteen inches can be installed within a cavity having a width of about thirteen inches or greater. For cavities of lesser widths, greater than about one and one half inches less in width than the pre-cut fibrous insulation blankets, the pre-cut fibrous insulation blankets may have one or more sections removed from the blankets so that the remaining portions of the pre-cut fibrous insulation blankets will better fit into the cavities being insulated.

The pre-cut fibrous insulation blanket of the present invention has at least one (preferably, two or more) series of cuts extending between a first major surface to a second major surface of the pre-cut fibrous insulation blanket with successive cuts of each series of cuts being separated by a series of separable connectors located intermediate the major surfaces of the pre-cut fibrous insulation blanket. Each series of cuts and separable connectors extend for the length of the pre-cut fibrous insulation blanket with each series of separable connectors holding together adjacent sections of the pre-cut fibrous insulation blanket for handling and being separable by hand whereby the pre-cut fibrous insulation blanket can be handled as a unit for insulating a cavity having a predetermined width, such as but not limited to a standard cavity width, or easily separated by hand into two or more sections at each series of separable connectors for insulating a cavity of lesser width, such as a cavity having less than a standard width.

The first or second major surface of the pre-cut fibrous insulation blanket may have a facing bonded thereto which, preferably, has one or more perforated lines or overlapping tabs (tabs which are adhesively bonded together), and/or tear strings for permitting the facing to be separated at each series of cuts and separable connectors in the pre-cut fibrous insulation blanket to facilitate separating or tearing apart the faced pre-cut insulation blanket by hand, if required. Preferably, the perforations of the perforated line(s) in the facing are closed by the bonding agent bonding the facing to the pre-cut fibrous insulation blanket. The filling of the perforations in the facing with the bonding agent helps to reinforce or increase the integrity of the facing at the perforations to prevent an unwanted separation of the facing at the perforations and enables the facing to function as a vapor barrier in spite of the perforations. Thus, the pre-cut fibrous insulation blanket with the facing can still be quickly and easily modified to fit a cavity of a particular width without sacrificing the vapor barrier properties of the facing sheet.

Preferably, the facing sheet has tabs for securing the faced pre-cut fibrous insulation blanket to framing members, e.g. with staples or an adhesive. These tabs may be located along each lateral edge of the pre-cut fibrous insulation blanket and facing sheet and pairs of tabs may be located adjacent each series of cuts and separable connectors in the pre-cut fibrous insulation blanket with the perforated lines in the facing sheet or an adhesive layer separably joining the tabs of each pair of tabs.

With the faced or unfaced pre-cut fibrous insulation blanket of the present invention, the pre-cut fibrous insulation blanket can be quickly and easily sized to fit wall, floor, ceiling, roof and other building cavities formed by the framework of a building without the need to use cutting tools at the job site to cut the insulation. Thus, the use of the pre-cut fibrous insulation blanket of the present invention to insulate the wall, floor, ceiling and roof cavities of buildings, especially wall cavities, not only reduces safety concerns, but greatly speeds up the installation process. Since insulation installers are frequently paid by the piece, the present invention enables them to operate more profitably.

DESCRIPTION OF THE PREFERRED EMBODIMENTS

Figure 1:
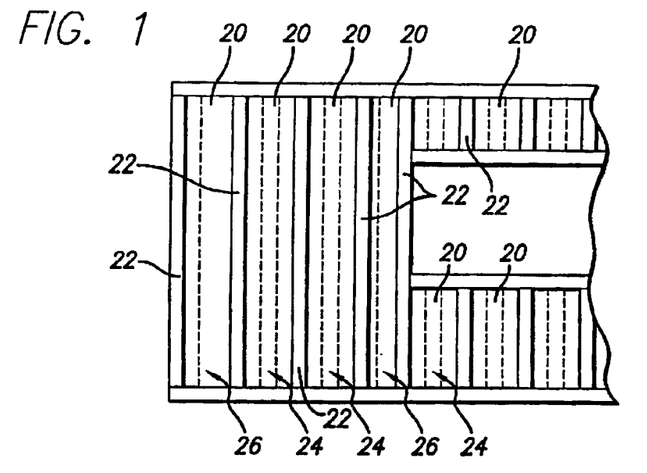
FIG. 1 is a schematic elevation of the framework in an outside wall of a building with pre-cut fibrous insulation blankets of the present invention installed in standard width and less than standard width wall cavities defined by the frame members.

FIG. 1 shows a portion of a typical outside wall of a residential house with a pre-cut, three section, fibrous insulation blanket 20 of the present invention installed in both standard width and non-standard width wall cavities of the outside wall. The widths of the wall cavities are defined by the framing members 22 (e.g. 2×4, 2×6 or 2×10 wall studs) which are spaced apart a standard distance (e.g. spaced apart on sixteen or twenty four inch centers) for standard width cavities 24 and less than the standard distance for non-standard width cavities 26.

While the unfaced and faced pre-cut fibrous insulation blankets of the present invention may be made of other fibrous materials, preferably the unfaced and faced pre-cut fibrous insulation blankets of the present invention are made of glass fibers and typically have a density between about 0.4 pounds/ft$^3$ and about 1.5 pounds/ft$^3$. Examples of other fibers that may be used to form the unfaced and faced pre-cut fibrous insulation blankets of the present invention are mineral fibers, such as but not limited to, rock wool fibers, slag fibers, and basalt fibers, and organic fibers such as but not limited to polypropylene, polyester and other polymeric fibers. The fibers in the unfaced and faced pre-cut fibrous insulation blankets of the present invention may be bonded together for increased integrity, e.g. by a binder at their points of intersection such as but not limited to urea phenol formaldehyde or other suitable bonding materials, or the unfaced and faced pre-cut fibrous insulation blankets of the present invention may be binderless provided the blankets possess the required integrity.

Preferably, the unfaced and faced pre-cut fibrous insulation blankets of the present invention are resilient so that, after being compressed to insert the pre-cut fibrous insulation blanket or section(s) of the pre-cut fibrous insulation blanket into a cavity having a width somewhat less than the width of the pre-cut fibrous insulation blanket or the section (s) of the pre-cut fibrous insulation blanket being inserted into the cavity, the pre-cut fibrous insulation blanket or one or more sections of the pre-cut fibrous insulation blanket inserted into the cavity will expand to the width of the cavity and press against the sides of the cavity to hold or help hold the pre-cut fibrous insulation blanket or section(s) of the pre-cut fibrous insulation blanket in place.

Typically, for most applications, such as walls in residential houses, the resilient, unfaced and faced pre-cut fibrous insulation blankets of the present invention are delivered to the installer in the form of batts about forty six to about forty eight inches long or about ninety three inches long or in the form of rolls of various lengths greater than ninety three inches in length. Typically, the widths of the unfaced and faced pre-cut fibrous insulation blankets of the present invention are substantially equal to or equal to the standard cavity width to be insulated with the pre-cut fibrous insulation blankets, e.g. about fourteen and one half to about fifteen inches wide for a cavity where the standard center to center spacing of the wall, floor, ceiling or roof framing members is sixteen inches (the cavity has a width of about fourteen and one half inches) and about twenty two and one half to about twenty three inches wide for a cavity where the standard center to center spacing of the wall, floor, ceiling or roof framing members is twenty four inches (the cavity has a width of about twenty two and one half inches). However for certain applications, the pre-cut fibrous insulation blanket may have a different initial width, such as but not limited to about thirteen to about thirteen and one half inches.

The following examples illustrate how the faced or unfaced pre-cut fibrous insulation blanket of the present invention may be formed into sections. For a faced or unfaced pre-cut fibrous insulation blanket having a width of about fifteen inches which is divided into three sections, the sections may be about three and one-half, about five, and about six and one-half inches wide (from right to left or left to right). For a faced or unfaced pre-cut fibrous insulation blanket having a width of about fifteen inches which is divided into four sections, preferably, the sections are about two and one half, about four, about four, and about four and one half inches wide (from left to right or right to left). Another example of section widths for a pre-cut fibrous insulation blanket about fifteen inches wide is about three and one-half, about four and one-half, about five and one-half, and about one and one-half inches wide (from right to left or left to right). For a faced or unfaced pre-cut fibrous insulation blanket having a width of about twenty three inches which is divided into four sections, preferably, the sections are about eleven and one half, about four, about four, and about three and one half inches wide (from left to right or right to left). For a faced or unfaced pre-cut fibrous insulation blanket having a width of about twenty three inches which is divided into six sections, preferably, the sections are about three, about four, about four, about three, about four and about five inches wide (from left to right or right to left). For a faced or unfaced pre-cut fibrous insulation blanket about thirteen inches in width which is divided into three sections, the sections may be about three, about four and one half and about five and one half inches wide.

Note that the preferred slit configurations for the fifteen inch and twenty three inch wide pre-cut fibrous insulation blankets are designed to provide blanket pieces in widths that for the most part differ in roughly two inch increments. For example with the preferred 2½ inch, 4 inch, 4 inch and 4½ inch wide section configuration of a fifteen inch wide pre-cut fibrous insulation blanket, with one tear of the unfaced or faced pre-cut fibrous insulation blanket, a blanket 2½ inches, 4½ inches, 6½ inches, 8½ inches, 10½ inches or 12½ inches in width can be formed to fit a cavity of a particular width less than a standard cavity width. For example with the preferred 3 inch, 4 inch, 4 inch, 3 inch, 4 inch, and 5 inch wide section configuration of a twenty three inch wide pre-cut fibrous insulation blanket, with one tear of the unfaced or faced pre-cut fibrous insulation blanket, a blanket 3 inches, 5 inches, 7 inches, 9 inches, 11 inches, 12 inches, 14 inches, 15 inches, 18 inches, or 20 inches in width can be formed to fit a cavity of a particular width less than a standard cavity width. Insulation installers generally custom cut insulation blankets to be about 1 inch to about 1½ inches wider than the cavity being insulated and the blanket widths formed above essentially permit cavities of all widths to be insulated with a piece of insulation blanket about ½ of an inch to about 2 inches wider than the cavity being insulated without over compressing the insulation in the direction of its width. In both the fifteen inch and twenty three inch wide pre-cut fibrous insulation blankets, the ability to form blanket pieces which generally differ in width in about two inch increments was accomplished by making the two outer most sections two inches different in width and then making the inner sections, except for one of the central sections of the twenty three inch wide blanket about four inches in width.

The thicknesses of the unfaced and faced pre-cut fibrous insulation blankets of the present invention are determined by the amount of thermal resistance or sound control desired and the depth of the cavities being insulated. Typically, the pre-cut fibrous insulation blanket is about three to about ten inches or greater in thickness and approximates the depth of the cavity being insulated. For example, in a wall cavity defined in part by nominally 2×4 or 2×6 inch studs or framing members, a pre-cut fibrous insulation blanket will have a thickness of about three and one-half inches or about five and one-quarter inches, respectively.

Figure 2:
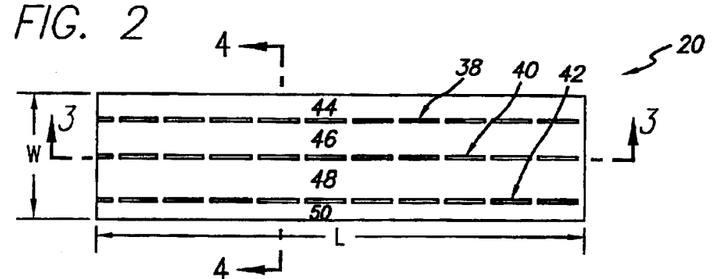
FIG. 2 is a schematic view of a major surface of an unfaced pre-cut fibrous insulation blanket of the present invention with three series of cuts and separable connectors in the fibrous insulation blanket.
Figures 3, 4, 5, 6, 7:
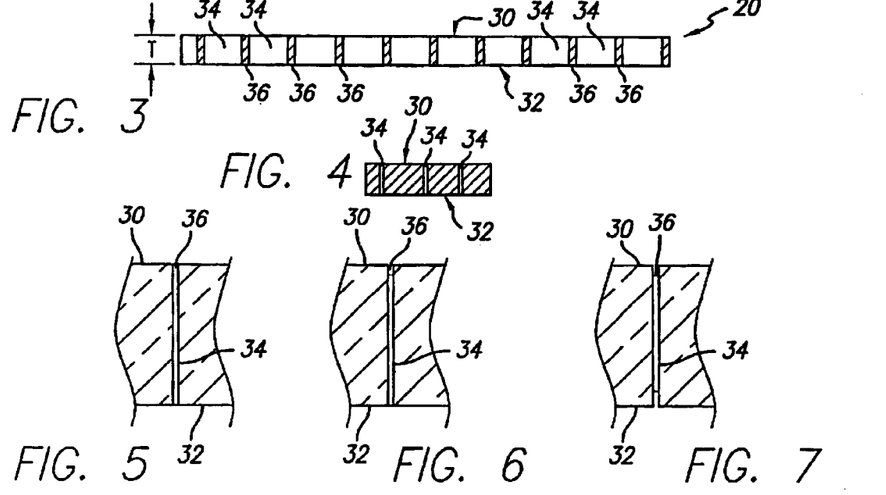
FIG. 3 is a schematic longitudinal section along one of the series of cuts and separable connectors of the unfaced pre-cut fibrous insulation blanket of FIG. 2, taken substantially along lines 3—3 of FIG. 2.
FIG. 4 is a schematic transverse section of the unfaced pre-cut fibrous insulation blanket of FIG. 2, taken substantially along lines 4—4 of FIG. 2.
FIG. 5 is a schematic view, on a larger scale than FIG. 4, of a separable connector of FIG. 4.
FIGS. 6 and 7 are schematic views, on a larger scale than FIG. 4, of different embodiments of the separable connector of FIG. 4.

FIGS. 2 to 4 show an unfaced embodiment 20 of the pre-cut fibrous insulation blanket of the present invention. The pre-cut fibrous insulation blanket has a length "L", a width "W" and a thickness "T". A first major surface 30 and a second major surface 32 of the pre-cut fibrous insulation blanket 20 are each defined by the width "W" and length "L" of the insulation blanket. There are one or more series of cuts 34 and separable connectors 36, preferably two or three series of cuts and separable connectors (three series of cuts and separable connectors 38, 40 and 42 are shown) which extend for the length of the pre-cut fibrous insulation blanket 20. Each series of cuts 34 and separable connectors 36 divide the pre-cut fibrous insulation blanket 20 into blanket sections with the pre-cut fibrous insulation blanket being divided lengthwise into two or more blanket sections and, preferably, three or four blanket sections (four blanket sections 44, 46, 48 and 50 are shown) extending the length of the pre-cut fibrous insulation blanket.

Each of the cuts 34 in each series of cuts and separable connectors 38, 40 and 42 extends from the first major surface 30 to the second major surface 32 of the pre-cut fibrous insulation blanket 20 and is separated from preceding and succeeding cuts 34 in its series of cuts and separable connectors by separable connectors 36. Each of the separable connectors 36 in each series of cuts and separable connectors 38, 40 and 42 may extend from the first major surface 30 to the second major surface 32 of the pre-cut fibrous insulation blanket and is separated from preceding and succeeding separable connectors 36 in its series of cuts and separable connectors by cuts 34. While each of the connectors 36 may extend from the first major surface 30 to the second major surface 32 of the pre-cut fibrous insulation blanket 20 as schematically shown in FIG. 5, and, preferably, has a height greater than one half the thickness "T" of the pre-cut fibrous insulation blanket, the connectors 36 may have a height less than one half the thickness "T" of the pre-cut fibrous insulation blanket 20. FIG. 6 shows a separable connector 36 which has a height greater than one half but less than the thickness "T" of the fibrous insulation blanket 20 with the separable connector 36 terminating short of the first major surface 30 of the pre-cut fibrous insulation blanket (e.g. about ⅛ to about ½ of an inch short of the first major surface). FIG. 7 shows a separable connector 36 which has a height that is greater than one half but less than the thickness "T" of the fibrous insulation blanket 20 with the separable connector 36 terminating short of both the first major surface 30 and the second major surface 32 of the pre-cut fibrous insulation blanket (e.g. about ⅛ to about ½ of an inch short of the first and second major surfaces). The heights and/or lengths of the separable connectors 36 used may vary with the integrity of the pre-cut fibrous insulation blanket 20 with the connectors typically being greater in height and/or length for insulation blankets with less integrity.

The fibers of the, preferably, compressible and resilient fibrous insulation blankets typically used in the pre-cut fibrous insulation blanket 20, e.g. glass fiber insulation blankets, are randomly oriented with respect to each other, but, due to the manner in which the fibers are collected to form a blanket, the fibers tend to lie predominately in layers or planes generally parallel to the major surfaces of the blanket. Thus, adjacent a major surface of a blanket, the blanket may tend to separate more easily along these layers than in a direction perpendicular to the layers when being pulled apart along a series of cuts and separable connectors. By having the separable connectors 36 terminating short of one or both of the major surfaces 30 and 32 of the pre-cut fibrous insulation blanket 20, there may be less tendency for the pre-cut fibrous insulation blanket to delaminate adjacent a major surface of the blanket when the blanket is separated at a series of cuts and separable connectors.

The relative lengths of the cuts 34 and separable connectors 36 are selected to ensure that the pre-cut fibrous insulation blanket 20 can be easily separated by hand at any of the series of cuts and separable connectors 38, 40 and 42 in the pre-cut fibrous insulation blanket. Generally, the cuts 34 are each about 1 to about 5 inches long and the separable connectors 36 are each about ⅛ to about ½ of an inch long. For example, a typical series of cuts and separable connectors may have cuts about 1 to about 1½ inches long and separable connectors about 3/16 to about ¼ of an inch long. The width of the cuts 34 forming the separable connectors 36 in both the faced and unfaced embodiments of the pre-cut fibrous insulation blanket of the present invention is typically about four thousands of an inch wide when cut by a water jet. The resilience of the blanket causes the cuts 34 in the pre-cut fibrous insulation blanket 20 to close after the cuts are made in the blanket.

With the separable connectors 36 of each series of cuts and separable connectors 38, 40 and 42 joining the adjacent blanket sections 44, 46, 48 and 50 of the pre-cut fibrous insulation blanket 20 together, the pre-cut fibrous insulation blanket 20 can be handled as a unit for insulating a cavity 24 having a predetermined width, such as but not limited to a thirteen inch width or a fourteen and one half or twenty two and one half standard cavity width, or easily separated or torn apart by hand at one or more of the series of cuts and separable connectors 38, 40 and/or 42 formed by the cuts 34 and separable connectors 36 (separated without the need to use of a knife or other cutting tool) into one or more sections 44, 46, 48 and/or 50 for insulating a cavity 26 having a lesser width, such as less than a standard cavity width.

FIGS. 8 to 15 show four different embodiments 120 to 420 of the faced pre-cut fibrous insulation blanket of the present invention. Preferably, the facings or facing sheets of the faced pre-cut fibrous insulation blankets 120 to 420 are made of kraft paper, a foil-scrim-kraft paper laminate, or a polymeric film, such as but not limited to polyethylene, and are bonded to a major surface of the pre-cut fibrous insulation blanket by a bonding agent. Preferably, the bonding agent for kraft paper or foil-scrim-kraft paper facings is an asphalt or other bituminous material that can be coated onto or otherwise applied to one side of the facing sheet just prior to applying the facing sheet to the pre-cut fibrous insulation blanket and the bonding agent for the polymeric film facing is a commercially available pressure sensitive adhesive that can be coated onto or otherwise applied to one side of the facing sheet just prior to applying the facing sheet to the pre-cut fibrous insulation blanket.

Figure 8:
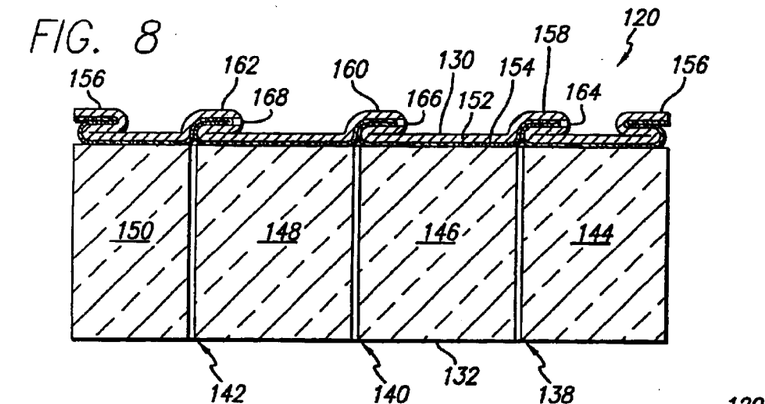
FIG. 8 is a schematic transverse cross section of a faced pre-cut fibrous insulation blanket of the present invention with integral tabs in the facing sheet, formed by Z-pleats, located adjacent each series of cuts and separable connectors in the pre-cut fibrous insulation blanket.
Figure 9:
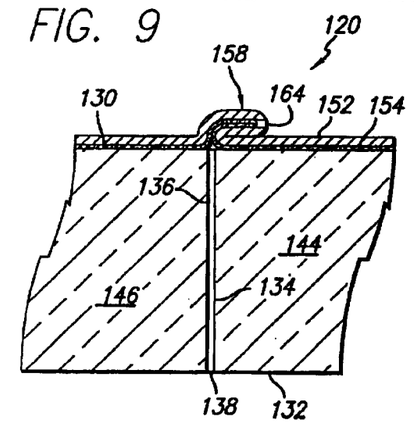
FIG. 9 is a partial schematic transverse cross section, on a larger scale than FIG. 8, of the faced pre-cut fibrous insulation blanket of FIG. 8.
Figure 10:
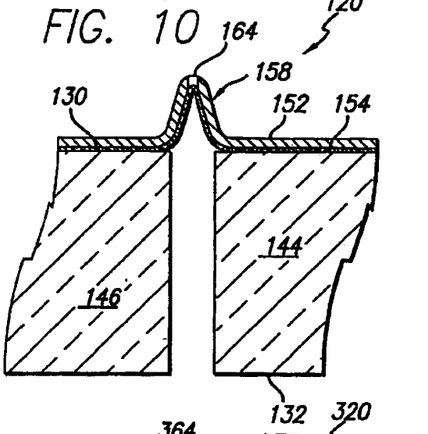
FIG. 10 is a partial schematic transverse cross section of the pre-cut fibrous insulation blanket of FIGS. 8 and 9 showing the faced pre-cut fibrous insulation blanket in the process of being separated along a series of cuts and separable connectors.

FIGS. 8 to 10 show a faced embodiment 120 of the pre-cut fibrous insulation blanket of the present invention. As shown, the faced pre-cut fibrous insulation blanket 120 of FIGS. 8 to 10 has a first major surface 130 and a second major surface 132. There are one or more series of cuts 134 and separable connectors 136, preferably two or three series of cuts separable connectors (three series of cuts and separable connectors 138, 140 and 142 are shown) in the faced pre-cut fibrous insulation blanket which extend for the length of the faced pre-cut fibrous insulation blanket 120. Each series of cuts 134 and separable connectors 136 divide the faced pre-cut fibrous insulation blanket 120 into blanket sections with the faced pre-cut insulation blanket being divided lengthwise into two or more blanket sections and, preferably, three or four blanket sections (four blanket sections 144, 146, 148 and 150 are shown) extending the length of the faced pre-cut fibrous insulation blanket.

Each of the cuts 134 in each series of cuts and separable connectors 138, 140 and 142 extends from the first major surface 130 to the second major surface 132 of the faced pre-cut fibrous insulation blanket 120 and is separated from preceding and succeeding cuts 134 in its series of cuts and separable connectors by separable connectors 136. Each of the separable connectors 136 in each series of cuts and separable connectors 138, 140 and 142 may extend from the first major surface 130 to the second major surface 132 of the faced pre-cut fibrous insulation blanket and is separated from preceding and succeeding separable connectors 136 in its series of cuts and separable connectors by cuts 134. While each of the connectors 136 may extend from the first major surface 130 to the second major surface 132 of the faced pre-cut fibrous insulation blanket 120 as schematically shown in FIGS. 8 and 9, and preferably, has a height greater than one half the thickness "T" of the pre-cut fibrous insulation blanket, the connectors 136 may have a height less than one half the thickness "T" of the faced pre-cut fibrous insulation blanket 120. For example, the separable connectors 136 can be like the separable connectors of FIG. 6 which shows a separable connector which has a height greater than one half but less than the thickness "T" of the faced pre-cut fibrous insulation blanket with the separable connector terminating short of the first major surface of the faced pre-cut fibrous insulation blanket (e.g. about ⅛ to about ½ of an inch short of the first major surface) or the separable connectors 136 can be like the separable connectors of FIG. 7 which shows a separable connector which has a height greater than one half but less than the thickness "T" of the faced pre-cut fibrous insulation blanket with the separable connector terminating short of both the first major surface and the second major surface of the faced pre-cut fibrous insulation blanket (e.g. about ⅛ to about ½ of an inch short of the first and second major surfaces). The heights and/or lengths of the separable connectors 136 can vary with the integrity of the faced pre-cut fibrous insulation blanket 120 with the connectors being greater in height and/or length for insulation blankets with less integrity.

The facing or facing sheet 152 typically overlies either the entire first major surface 130 or second major surface 132 of the pre-cut fibrous insulation blanket 120 and is secured by a bonding agent 154 to the major surface of the pre-cut fibrous insulation blanket which it overlies. As shown in FIG. 8, the facing sheet 152 has lateral tabs 156 and pairs of tabs 158, 160 and 162 adjacent each of the series of cuts and separable connectors 138, 140 and 142 in the faced pre-cut fibrous insulation blanket 120 for stapling or otherwise securing the faced pre-cut fibrous insulation blanket or section(s) of the faced pre-cut fibrous insulation blanket to frame members. The lateral tabs 156, which preferably are formed by Z-shaped pleats in the facing 152, extend for the length of the faced pre-cut fibrous insulation blanket 120 and the pairs of tabs 158, 160 and 162 are longitudinally aligned with and extend for the lengths of the series of cuts and separable connectors 138, 140 and 142 of the faced pre-cut fibrous insulation blanket 120. Each pair of tabs 158, 160 and 162 is formed by a Z-shaped pleat in the facing sheet 152 with the tabs of each pair of tabs 158, 160 and 162 being separably connected to each other by perforated lines 164, 166 and 168, respectively so that the facing can be separated at each series of cuts and separable connectors. With this structure, the faced pre-cut fibrous insulation blanket 120 with the facing 152, can be handled as a unit for insulating a cavity having a predetermined width, such as but not limited to a thirteen inch width or a fourteen and one half or twenty two and one half inch standard cavity width, or easily separated or torn apart by hand into blanket sections 144, 146, 148 and/or 150 by separating or tearing apart the faced pre-cut fibrous insulation blanket 120 at the series of cuts and separable connectors 138 in the blanket and the perforated line 164 of the facing sheet 152, the series of cuts and separable connectors 140 in the blanket and the perforated line 166 of the facing sheet 152, or the series of cuts and separable connectors 142 in the blanket and the perforated line 168 of the facing sheet 152 (separated without the need to use of a knife or other cutting tool) for insulating a cavity having a lesser width, e.g. less than a standard cavity width.

The spaced apart perforations of the perforated lines 164, 166 and 168 may be of various shapes, including but not limited to, round, oval, elongated, slit shaped, etc. and the spacing between perforations and the length of the perforations may vary as long as the facing is easily separated by hand along the line formed by the perforations. Preferably, the perforations of perforated lines 164, 166 and 158 in the embodiment of FIGS. 8 to 10, are filled, e.g. with the bonding agent 154 that bonds the facing sheet 152 to one of the major surfaces of the faced pre-cut fibrous insulation blanket or a similar material, to close the perforations so that the facing sheet 152 functions as a vapor barrier. While perforations are preferred, tear strings could be used with or substituted for the perforated lines 164, 166 and 168. The tear strings would have a free end for gripping; be bonded to the facing by the bonding agent 154; and would extend along lines that coincide with the locations of the perforated lines 164, 166 and 168.

The use of pairs of tabs 158, 160 and 162 formed by Z-shaped pleats in the facing 152 wherein the tabs of each pair of tabs are separably bonded together by the bonding agent 154 bonding the facing 152 to a major surface of the faced pre-cut fibrous insulation blanket provides several advantages: the overlapping and bonding together of the tabs across their widths in each pair of tabs with the perforations at the juncture of the tabs improves the vapor barrier properties of the perforated facing; there is less tendency for the facing 152 to split during installation because the bonding agent 154 joining the tabs of each pair of tabs together can yield when the faced pre-cut fibrous insulation blanket is flexed; the folds at the perforations in the Z-shaped pleats facilitate the tearing of the facing 152 at the perforations and help prevent the tears from propagating out of the tabs; and, as shown in FIG. 10, as the blanket sections adjacent a pair of tabs are separated, the tabs which initially lie on a major surface of the blanket are pulled away from the major surface of the blanket to extend generally perpendicular to the major surface of the blanket for better grasping by a worker as the tabs peel away from each other and finally separate from each other along the perforated lines. In addition, the use of facing tabs adjacent each series of cuts and separable connectors between blanket sections, in this and other faced embodiments of the invention, not only provides tabs for securing the blanket sections in place, but also enables the facings to provide vapor barriers across the entire width of blanket sections even when the means for separating the facings along each series of cuts and separable connectors, e.g. perforated lines, are not properly aligned with each series of cuts and separable connectors.

The integral tabs adjacent each series of cuts and separable connectors plus lateral tabs, such as the lateral tabs shown in FIG. 8, can be used to secure the faced pre-cut fibrous insulation blanket 120 or blanket sections of the faced pre-cut fibrous insulation blanket 120 to framing members, by stapling or other conventional means, either as a unit or as one or more sections when one or more blanket sections are separated from the remainder of the faced pre-cut fibrous insulation blanket. Preferably, the tabs are about one half to about one and one half inches in width. When securing the faced pre-cut fibrous insulation blanket 120 or one or more blanket sections of the faced pre-cut fibrous insulation blanket to framing members, the tabs adjacent the series of cuts and separable connectors and lateral tabs used to secure the blanket are at least partially unfolded and extended outward from the faced pre-cut fibrous insulation blanket or blanket sections of the faced pre-cut fibrous insulation blanket prior to stapling or otherwise securing the tabs to the framing members.

Figure 11:
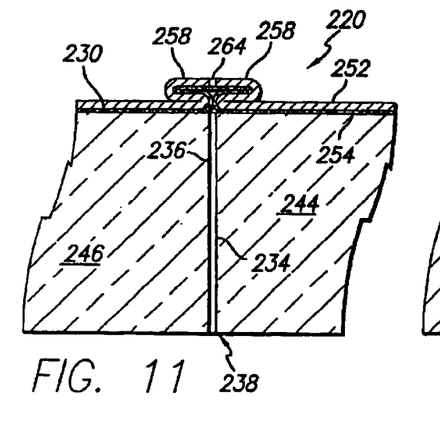
FIG. 11 is a partial schematic transverse cross section of a faced pre-cut fibrous insulation blanket of the present invention with integral tabs in the facing sheet, formed by double Z-pleats, located adjacent one of the series of cuts and separable connectors in the pre-cut fibrous insulation blanket.

FIG. 11 is a partial transverse cross section of a second embodiment 220 of the faced pre-cut fibrous insulation blanket of the present invention through one of the series 238 of cuts 234 and separable connectors 236 of the insulation blanket and a portion of the facing 252 adjacent the series 238 of cuts and separable connectors which overlays and is bonded to a first major surface 230 of the faced pre-cut fibrous insulation blanket. Except for the pairs of tabs formed in the facing 252, the faced pre-cut fibrous insulation blanket 220 of FIG. 11 is the same, as the faced pre-cut insulation blanket 120 of FIGS. 8 and 9. As shown, the facing 252 is provided with a pair of integral, tabs 258 adjacent and extending for the length of the series 238 of cuts and separable connectors of the faced pre-cut fibrous insulation blanket. The pair of tabs 258 are formed by a double Z-shaped pleat in the facing 252 with the tabs 258 being joined together along a perforated line 264 in the facing that is aligned with the series 238 of cuts and separable connectors so that the tabs 258 can be separated from each other at the series 238 of cuts and separable connectors when the blanket sections 244 and 246 are separated from each other. Each tab 258 is formed by twice folding the facing sheet 252 back upon itself into a Z-shaped pleat, and identical pairs of integral tabs are located adjacent and extend for the length of the each additional series of cuts and separable connectors of the faced pre-cut fibrous insulation blanket 220, joining blanket sections of the faced pre-cut fibrous insulation blanket. With this structure, the faced pre-cut fibrous insulation blanket 220 with the facing 252, can be handled as a unit for insulating a cavity having a predetermined cavity width, such as but not limited to a thirteen inch or a standard cavity width or easily separated or torn apart by hand into one or more blanket sections by separating or tearing apart the faced pre-cut fibrous insulation blanket 220 at any one or more of the series of cuts and separable connectors and the perforated lines of the facing sheet 252 adjacent the particular series of cuts and separable connectors (separated without the need to use of a knife or other cutting tool) for insulating a cavity having a lesser cavity Width, e.g. less than a standard cavity width.

The spaced apart perforations of the perforated lines may be of various shapes, including but not limited to, round, oval, elongated, slit shaped, etc., and the spacing between perforations and the length of the perforations may vary as long as the facing is easily separated by hand along the line(s) formed by the perforations. Preferably, the perforations of perforated lines in the facing 252 of the faced pre-cut fibrous insulation blanket 220 are filled, e.g. with the bonding agent 254 that bonds the facing sheet 252 to a major surface of the pre-cut fibrous insulation blanket or a similar material, to close the perforations so that the facing sheet 252 functions as a vapor barrier. While perforations are preferred, tear strings could be used with or substituted for the perforated lines. The tear strings would have a free end for gripping; be bonded to the facing by the bonding agent 254; and would extend along lines that coincide with the locations of the perforated lines.

The integral tabs adjacent each series of cuts and separable connectors plus lateral tabs, such as the lateral tabs shown in FIG. 8, can be used to secure the faced pre-cut fibrous is insulation blanket 220 or blanket sections of the faced pre-cut fibrous insulation blanket 220 to framing members, by stapling or other conventional means, either as a unit or as one or more sections when one or more blanket sections are separated from the remainder of the faced pre-cut fibrous insulation blanket. Preferably, the tabs are about one half to about one and one half inches in width. When securing the faced pre-cut fibrous insulation blanket 220 or one or more blanket sections of the faced pre-cut fibrous insulation blanket to framing members, the tabs adjacent the series of cuts and separable connectors and lateral tabs used to secure the blanket are at least partially unfolded and extended outward from the faced pre-cut fibrous insulation blanket or blanket sections of the faced pre-cut fibrous insulation blanket prior to stapling or otherwise securing the tabs to the framing members.

Figure 12:
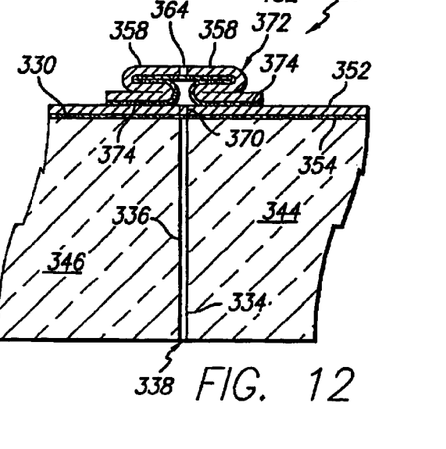
FIG. 12 is a partial schematic transverse cross section of a faced pre-cut fibrous insulation blanket of the present invention with tabs, formed by double Z-pleats in a separate sheet of facing material, located adjacent one of the series of cuts and separable connectors in the pre-cut fibrous insulation blanket.

FIG. 12 is a partial transverse cross section of a third embodiment 320 of the faced pre-cut fibrous insulation blanket of the present invention through one of the series 338 of cuts 334 and separable connectors 336 of the insulation blanket and a portion of the facing 352 adjacent the series 338 of cuts and separable connectors which overlays and is bonded to a first major surface 330 of the faced pre-cut fibrous insulation blanket. Except for the structure of the tabs and facing sheet adjacent each series of cuts and separable connectors, the faced pre-cut fibrous insulation blanket 320 of FIG. 12 is the same as the faced pre-cut insulation blanket 220 of FIG. 11. As shown, the facing 352 is provided with a cut or perforated line 370. The perforated line 370 is aligned with and extends for the length of the series 338 of cuts and separable connectors so that the facing 352 can be separated at the series of cuts and separable connectors, if desired. A separate sheet of facing material 372 is bonded by a bonding agent 374 to the facing 352 on either side of the perforated line 370 and extends for the length of the perforated line. The sheet 372 has a pair of tabs 358 adjacent and extending for the length of the series 338 of cuts and separable connectors of the pre-cut fibrous insulation blanket. The pair of tabs 358 are formed by a double Z-shaped pleat in the facing material 372 with the tabs 358 being joined together along a perforated line 364 that is aligned with the series 338 of cuts and separable connectors so that the tabs can be separated from each other at the series 338 of cuts and separable connectors when the blanket sections 344 and 346 are separated from each other. Each tab 358 is formed by twice folding the sheet 372 of facing material back upon itself into a Z-shaped pleat, and identical pairs of integral tabs are located adjacent and extend for the length of the each additional series of cuts and separable connectors of the faced pre-cut fibrous insulation blanket 320, joining blanket sections of the faced pre-cut fibrous insulation blanket. With this structure, the faced pre-cut fibrous insulation blanket 320 With the facing 352, can be handled as a unit for insulating a cavity having a predetermined cavity width, such as but not limited to a thirteen inch width or a fourteen and one half or twenty two and one half inch standard cavity width, or easily separated or torn apart by hand into one or more blanket sections by separating or tearing apart the faced pre-cut fibrous insulation blanket 320 at any one or more of the series of cuts and separable connectors and the perforated lines of the facing sheet 352 and tabs adjacent the particular series of cuts and separable connectors (separated without the need to use of a knife or other cutting tool) for insulating a cavity having lesser width, e.g. less than a standard cavity width.

The spaced apart perforations of the perforated lines may be of various shapes, including but not limited to, round, oval, elongated, slit shaped, etc., and the spacing between perforations and the length of the perforations may vary as long as the facing is easily separated by hand along the line(s) formed by the perforations. Preferably, the perforations of perforated lines in the facing 352 and between the tabs adjacent each series of cuts and separable connectors of the faced pre-cut fibrous insulation blanket 320 are filled, e.g. with the bonding agents 354 and 374 that bond the facing sheet 352 to a major surface of the pre-cut fibrous insulation blanket and the sheet of facing material 372 to the facing sheet 352 or a similar material, to close the perforations so that the facing sheet 352 functions as a vapor barrier. While perforations are preferred, tear strings could be used with or substituted for the perforated lines. The tear strings would have a free end for gripping; be bonded to the facing by the bonding agent 354; and would extend along lines that coincide with the locations of the perforated lines.

The tabs adjacent each series of cuts and separable connectors plus lateral tabs, such as the lateral tabs 160 shown in FIG. 8, can be used to secure the faced pre-cut fibrous insulation blanket 320 or blanket sections of the faced pre-cut fibrous insulation blanket 320 to framing members, by stapling or other conventional means, either as a unit or as one or more blanket sections when one or more blanket sections are separated from the remainder of the faced pre-cut fibrous insulation blanket. Preferably, the tabs are about one half to about one and one half inches in width. When securing the faced pre-cut fibrous insulation blanket 320 or one or more blanket sections of the faced pre-cut fibrous insulation blanket to framing members, the tabs adjacent the series of cuts and separable connectors and lateral tabs used to secure the blanket are at least partially unfolded and extended outward from the faced pre-cut fibrous insulation blanket or blanket sections of the faced pre-cut fibrous insulation blanket prior to stapling or otherwise securing the tabs to the framing members.

Figure 13:
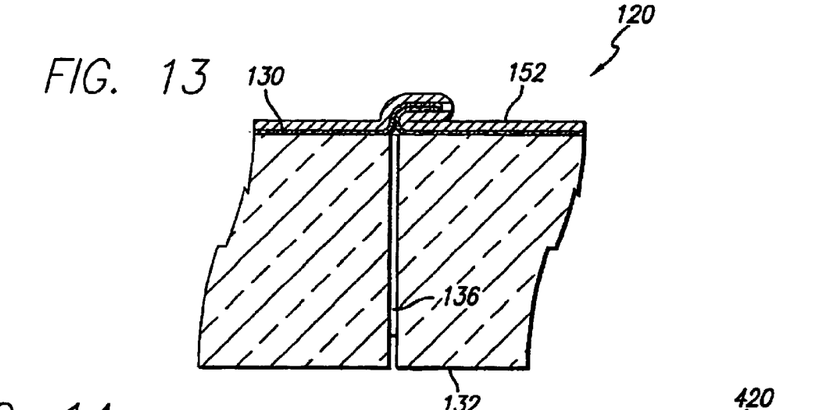
FIG. 13 is a partial schematic transverse cross section through a faced, pre-cut fibrous insulation blanket of the present invention with integral tabs in the facing sheet, formed by a Z-pleat, adjacent one of the series of cuts and separable connectors in the pre-cut fibrous insulation blanket.

FIG. 13 shows an embodiment of the faced pre-cut fibrous insulation blanket 120 wherein the separable connectors 136 do not extend to one of the major surfaces 132 of the pre-cut fibrous insulation blanket and the facing 152 is bonded to the other major surface 130 of the pre-cut fibrous insulation blanket. With the separable connectors 136 partially cut at the second major surface of the pre-cut fibrous insulation blanket 120, the blanket sections may be easier to separate from each other, by beginning the separation or tear from the surface 132, without any delamination of the blanket.

Figure 14:
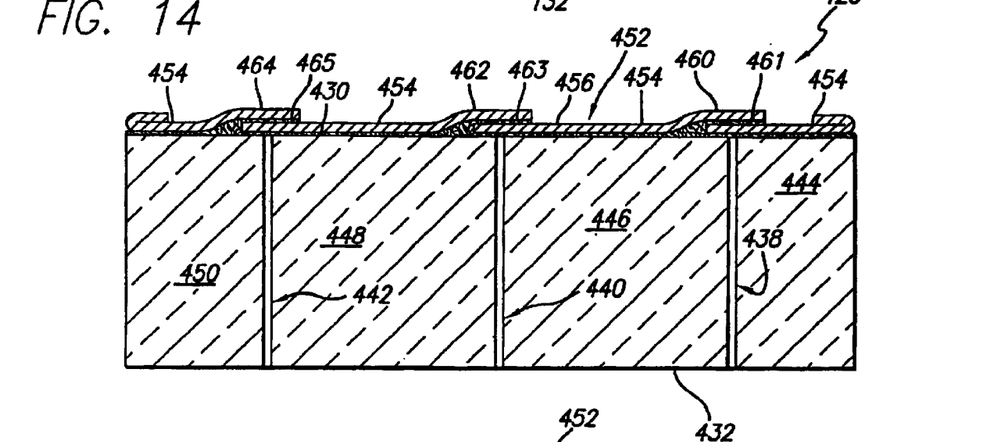
FIG. 14 is a schematic transverse cross section of a faced pre-cut fibrous insulation blanket of the present invention with integral tabs in the facing sheet, formed by overlapping lateral edge portions of a series of sheets forming the facing, located adjacent each series of cuts and separable connectors in the pre-cut fibrous insulation blanket.
Figure 15:
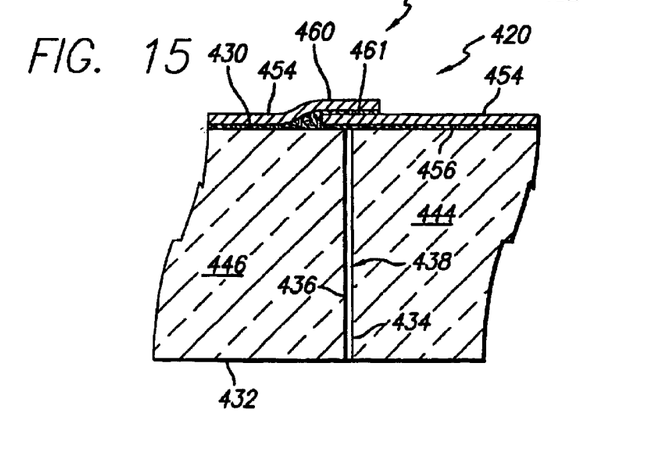
FIG. 15 is a partial schematic transverse cross section, on a larger scale than FIG. 14, of the faced pre-cut fibrous insulation blanket of FIG. 14.

FIGS. 14 and 15 show a faced embodiment 420 of the pre-cut fibrous insulation blanket of the present invention. As shown, the faced pre-cut fibrous insulation blanket 420 of FIGS. 14 and 15 has a first major surface 430 and a second major surface 432. There are one or more series of cuts 434 and separable connectors 436, preferably two or three series of cuts separable connectors (three series of cuts and separable connectors 438, 440 and 442 are shown) in the faced pre-cut fibrous insulation blanket which extend for the length of the faced pre-cut fibrous insulation blanket 420. Each series of cuts 434 and separable connectors 436 divide the faced pre-cut fibrous insulation blanket 420 into blanket sections with the faced pre-cut insulation blanket being divided lengthwise into two or more blanket sections and, preferably, three or four blanket sections (four blanket sections 444, 446, 448 and 450 are shown) extending the length of the faced pre-cut fibrous insulation blanket.

Each of the cuts 434 in each series of cuts and separable connectors 438, 440 and 442 extends from the first major surface 430 to the second major surface 432 of the faced pre-cut fibrous insulation blanket 420 and is separated from preceding and succeeding cuts 434 in its series of cuts and separable connectors by separable connectors 436. Each of the separable connectors 436 in each series of cuts and separable connectors 438, 440 and 442 may extend from the first major surface 430 to the second major surface 432 of the faced pre-cut fibrous insulation blanket and is separated from preceding and succeeding separable connectors 436 in its series of cuts and separable connectors by cuts 434. While each of the connectors 436 may extend from the first major surface 430 to the second major surface 432 of the faced pre-cut fibrous insulation blanket 420 as schematically shown in FIGS. 14 and 15, and, preferably, has a height greater than one half the thickness of "T" of the pre-cut fibrous insulation blanket, the connectors 436 may be less than the thickness "T" of the faced pre-cut fibrous insulation blanket 420. For example, the separable connectors 436 can be like the separable connectors of FIG. 6 which shows a separable connector which has a height greater than one half but less than the thickness "T" of the faced pre-cut fibrous insulation blanket with the separable connector terminating short of the first major surface of the faced pre-cut fibrous insulation blanket (e.g. about ⅛ to about ½ of an inch short of the first major surface) or the separable connectors 436 can be like the separable connectors of FIG. 7 which shows a separable connector which has a height greater than one half but less than the thickness "T" of the faced pre-cut fibrous insulation blanket with the separable connector terminating short of both the first major surface and the second major surface of the faced pre-cut fibrous insulation blanket (e.g. about ⅛ to about ½ of an inch short of the first and second major surfaces). The heights and/or lengths of the separable connectors 436 may vary with the integrity of the faced pre-cut fibrous insulation blanket 420 with the connectors being greater in height and/or length for insulation blankets with less integrity.

The facing 452 of the pre-cut fibrous insulation blanket 420 is made of a plurality or series of sheets 854 which overlap successive sheets forming the facing 452. The facing or facing sheet 452, formed by the series of overlapping sheets 454, typically overlies the entire second major surface 432 of the faced pre-cut fibrous insulation blanket 420 and is bonded to the second major surface of the faced pre-cut fibrous insulation blanket 420 by a bonding agent 456. As shown in FIG. 14, the facing sheet 452 has lateral tabs 458 and pairs of tabs 460 and 461, 462 and 463, and 464 and 465, adjacent each series of the cuts and separable connectors 438, 440 and 442 in the faced pre-cut fibrous insulation blanket 420 for stapling or otherwise securing the faced pre-cut fibrous insulation blanket or section(s) of the faced pre-cut fibrous insulation blanket to frame members. The lateral tabs 458 extend for the length of the faced pre-cut fibrous insulation blanket 420. The pairs of tabs 460 and 461, 462 and 463, and 464 and 465 are aligned or substantially aligned longitudinally with and extend for the lengths of each series of cuts and separable connectors 438, 440 and 442 of the faced pre-cut fibrous insulation blanket 420. Each pair of tabs 460 and 461, 462 and 463, and 464 and 465 is formed by a lateral edge portion of a preceding sheet 454 overlapping a lateral edge portion of a succeeding sheet 454 at each of the series of cuts and separable connectors 438, 440 and 442 in the faced pre-cut fibrous insulation blanket 420 with both lateral portions of the sheets extending laterally beyond the series of cuts and separable connectors in opposite directions as shown in FIGS. 14 and 15. The tabs 460 and 461, 462 and 463, and 464 and 465 of each pair of tabs are separably bonded together by the bonding agent 456 or a similar adhesive so that the facing can be separated at each of the cuts and separable connectors. With this structure, the faced pre-cut fibrous insulation blanket 420 with the facing 452, can be handled as a unit for insulating a cavity having a predetermined width, such as but not limited to a thirteen inch width or a standard cavity width of fourteen and one half or twenty two and one half inches, or easily separated or torn apart by hand into blanket sections 444, 446, 448 and/or 450 by separating or tearing apart the faced pre-cut fibrous insulation blanket 420 at the series of cuts and separable connectors 438 in the blanket and the tabs 460 and 461 of the facing sheet 452, the series of cuts and separable connectors 440 in the blanket and the pair of tabs 462 and 463 of the facing sheet 452, or the series of cuts and separable connectors 442 in the blanket and the pair of tabs 464 and 465 of the facing sheet 452 (separated without the need to use of a knife or other cutting tool) for insulating a cavity having a lesser width, e.g. less than a standard cavity width.

Preferably, the lateral edge portions of the sheets 454 forming the facing sheet 252 are bonded together e.g. with the bonding agent 456 that bonds the facing sheet 452 to the first major surface 430 of the pre-cut fibrous insulation blanket or a similar material, so that the facing sheet 452 functions as a vapor barrier. The pairs of tabs 460 and 461, 462 and 463, and 464 and 465 adjacent each series of cuts and separable connectors 438, 440 and 442 in the faced pre-cut fibrous insulation blanket 420 plus lateral tabs, such as the lateral tabs 458 shown in FIG. 14, can be used to secure the sections 444, 446, 448 and 450 of the faced pre-cut fibrous insulation blanket 420 to framing members, by stapling or other conventional means, either as a unit or as one or more sections when one or more sections 444, 446, 448 and 450 are separated from the remainder of the faced pre-cut fibrous insulation blanket. Preferably, each tab is about one half of an inch to about one and one half inches wide. When securing the faced pre-cut fibrous insulation blanket 420 or one or more sections 444, 446, 448 and 450 of the faced pre-cut fibrous insulation blanket to framing members, the pairs tabs 460 and 461, 462 and 463, and 464 and 465, and lateral tabs 458 used to secure the blanket are extended outward from the faced pre-cut fibrous insulation blanket 420 or sections 444, 446, 448 and/or 450 of the faced pre-cut fibrous insulation blanket prior to stapling or otherwise securing the tabs to the framing members.

Figure 16:
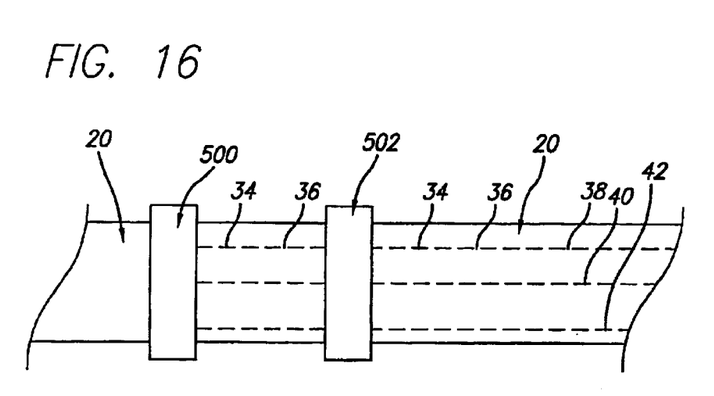
FIG. 16 is a schematic plan view of a production line for making a faced or unfaced pre-cut fibrous insulation blanket of the present invention.
Figure 17:
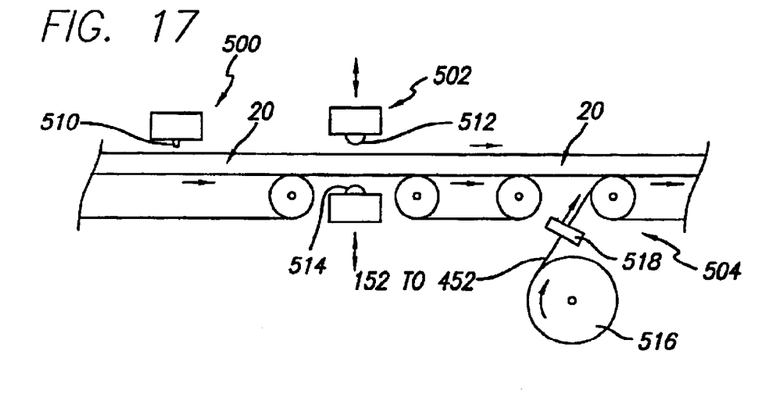
FIG. 17 is a schematic side elevation view of a production line for making a faced or unfaced pre-cut fibrous insulation blanket of the present invention.

FIGS. 16 and 17 schematically show a preferred method of making the unfaced pre-cut fibrous insulation blanket 20 or the faced pre-cut fibrous insulation blanket 120, 220, 320 and 420 of the present invention. According to the preferred method of the present invention a fibrous insulation blanket, typically about eight feet wide, and cut longitudinally into a series of four or more blankets 20 (e.g. individual blankets about thirteen, fifteen or twenty three inches wide, only one of which is shown for the purposes of illustration), is fed through a water jet cutting station or a compression cutting station 500, a rotary saw cutting station 502, and a facing station 504. From the facing station, the pre-cut fibrous insulation blankets 20, 120, 220, 320 or 420 are fed to a windup station (not shown) where the pre-cut fibrous insulation blankets are wound up for packaging and shipment or are fed through a conventional chopper and into a conventional batt packing station (not shown) where the batts are stacked and packaged for shipment.

Figure 18:
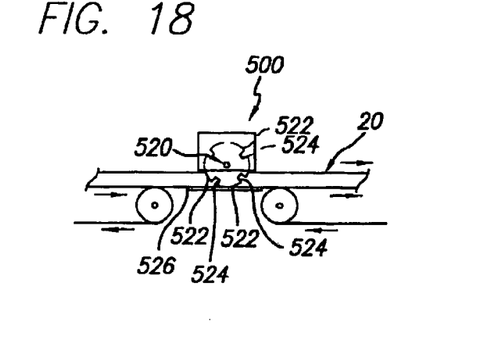
FIG. 18 is a schematic side elevation view of the cutting station in the production line for forming the cuts and connectors in the insulation blanket with a compression cutter.

The water jet cutting or compression cutting, station 500 utilizes either a series of conventional, commercially available water jets 510, such as 6X5-55 Water jets sold by Flow International Corp., or a series of rotating compression slitters or cutters 520, such as the compression cutter schematically shown in FIG. 18. The water jets 510 or the compression slitters 520 of the cutting station 500 are spaced apart from each other across the width of the cutting station 500. When used, the water jets 510 are activated or fired periodically to send jets of water through each fibrous insulation blanket 20 and form one or more spaced apart longitudinally extending perforated lines of alternating cuts 34 and separable connectors 36 in each fibrous insulation blanket 20, such as the perforated lines 38, 40 and 42 shown in FIG. 16. When used, the portions 522 of the rotating compression slitters 520 intermediate the notches 524 in the periphery of the circular cutting edges of the rotating compression slitter form the cuts 34 in the blanket while the notches 524 form the separable connectors 36 in the blanket as the blanket passes between the rotating cutter and a backing plate 526. The spacing between the notches 524 determines the lengths of the cuts 34 and the widths of the notches 524 determines the lengths of the connectors 36.

Each fibrous blanket 20 with the perforated lines, e.g. lines 38, 40 and 42, then passes through the rotary saw cutting station 502 which has an upper series of rotary saws 512 and a lower series of rotary saws 514 that are spaced apart from each other across the width of the station and aligned with the upstream water jets 510 in the water jet cutting station 500. Where no partial cuts are formed in the separable connectors 36 of the perforated lines in the pre-cut fibrous insulation blanket 20, as shown in FIG. 5, the rotary saws of the rotary saw cutting station 502 are not brought into contact with the fibrous insulation blanket 20. Where partial cuts are formed in the separable connectors 36 adjacent one major surface of each fibrous insulation blanket 20, either the upper or the lower series of saws 512 or 514 are brought into contact with each fibrous insulation blanket and form cuts having a predetermined depth in the separable connectors 36. Where partial cuts are formed in the separable connectors adjacent both major surfaces of each fibrous insulation blanket 20, both the upper and lower series of saws 512 and 514 are brought into contact with the fibrous insulation blanket and form cuts having predetermined depths at both ends of the separable connectors 36.

When the fibrous insulation blankets 20 are to be faced, each pre-cut fibrous insulation blanket 20 is fed through the facing station 504 where a facing sheet, such as one of the facing sheets 152, 252, 352 and 452 shown in FIGS. 8 to 15, is applied and bonded to the underside of the pre-cut fibrous insulation blanket 20. When the facing sheet 152, 252 or 352 is applied to the fibrous insulation blanket 20, the facing sheet has one or more pairs of tabs, joined by longitudinally extending perforated lines, and lateral tabs which extend for the length of the facing sheet. The facing 152, 252 or 352, which may have its tabs pre-formed, the perforations in its perforated lines filled, and be coated with a bonding agent on the major surface to be applied to the pre-cut fibrous insulation blanket, is fed from a supply roll 516. Where the bonding agent is an asphalt or another bituminous material, the facing 152, 252 or 352 is passed through a heater station 518 to heat the bonding agent. The facing sheet is then applied to underside or lower major surface of the pre-cut fibrous insulation blanket 20, while the bonding agent is still hot, with the pairs of tabs joined by the perforated lines in the facing sheet longitudinally aligned with the lines of cuts and separable connectors, e.g. lines 38, 40 and 42, in the pre-cut fibrous insulation blanket 20 and the facing sheet is bonded to the blanket to form the pre-cut fibrous insulation blanket 120, 220 or 320. Where a pressure sensitive adhesive is used to bond the facing sheet 152, 252 or 352 to the pre-cut fibrous insulation blanket 20, the preformed facing sheet with pressure sensitive adhesive on one major surface is fed from the supply roll 516 and the major surface of the facing sheet with the bonding agent thereon is then brought into contact with, pressed against and bonded to the underside or lower major surface of the pre-cut fibrous insulation blanket 20 with the pairs of tabs joined by the perforated lines in the facing sheet longitudinally aligned with the lines of cuts and separable connectors, e.g. lines 38, 40 and 42, in the pre-cut fibrous insulation blanket 20.

When the facing 452 is applied to each fibrous insulation blanket 20, the facing has one or more longitudinally extending pairs of overlapping tabs which are adhesively bonded together, plus lateral tabs extending for the length of the facing sheet. The facing 452, which may have its tabs pre-formed, and be coated with a bonding agent on the major surface to be applied to the pre-cut fibrous insulation blanket, is fed from the supply roll 516. Where the bonding agent is an asphalt or another bituminous material, the facing 452 is passed through a heater station 518 to heat the bonding agent. The facing sheet is then applied to underside or lower major surface of the pre-cut fibrous insulation blanket 20, while the bonding agent is still hot, with the pairs of tabs in the facing sheet longitudinally aligned with the lines of cuts and separable connectors, e.g. lines 38, 40 and 42, in the pre-cut fibrous insulation blanket 20 and the facing sheet is bonded to the blanket to form the pre-cut fibrous insulation blanket 420. Where a pressure sensitive adhesive is used to bond the facing sheet 452 to the pre-cut fibrous insulation blanket 20, the preformed facing sheet with pressure sensitive adhesive on one major surface is fed from the supply roll 516 and the major surface of the facing sheet with the bonding agent thereon is then brought into contact with, pressed against and bonded to the underside or lower major surface of the pre-cut fibrous insulation blanket 20 with the pairs of tabs in the facing sheet longitudinally aligned with the lines of cuts and separable connectors, e.g. lines 38, 40 and 42, in the pre-cut fibrous insulation blanket 20.

While the in the method described above, the facing sheets 152 to 452 are pre-formed and pre-coated with a bonding agent and fed from a supply roll 516, the facing sheets 120 to 420 may also be formed on line and thereafter applied directly to the pre-cut fibrous insulation blanket 20. With the facing sheets 152 to 452, the faced pre-cut fibrous insulation blanket formed can be handled as a unit or easily torn apart at one or more of the perforated lines in the blanket and the perforated lines joining the tabs in the facing by hand (without the need to use of a knife or other cutting tool) for insulating a cavity of lesser width than the faced pre-cut fibrous insulation blanket. The pre-cut faced fibrous insulation blanket 120, 220, 320 or 420 is then formed into a roll in the windup station or cut transversely into selected lengths to form batts (not shown), e.g. forty eight or ninety three inch length batts, which are stacked and packaged.

As an example of the versatility of the pre-cut fibrous insulation blankets 20 to 420, the preferred different widths of the sections, when three sections are formed in a fifteen inch wide embodiment of the invention, enable the pre-cut fibrous insulation blankets 20 to 420 to be quickly and easily formed into widths of about three and one-half inches (e.g. section 44), five inches (e.g. section 46), six and one-half inches (e.g. section 48), eight and one-half inches (e.g. sections 34 and 46) and eleven and one-half inches (e.g. sections 46 and 48). Where the pre-cut fibrous insulation blanket is separated into four sections, the installer has even more options. Thus, the pre-cut fibrous insulation blankets 20 to 420 can not only be used to insulate cavities having standard widths, but the width of the pre-cut fibrous insulation blanket can also be quickly and easily modified to fit cavities of various non-standard widths. The use of a resilient fibrous insulation blanket 20 to 420, such as a resilient glass fiber insulation blanket, further enhances the ability of the pre-cut fibrous insulation blanket to conform to various cavity widths.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A facing sheet for overlying and being bonded to a major surface of a fibrous insulation blanket; the fibrous insulation blanket having a length, a width and a thickness; the fibrous insulation blanket having a first major surface and a second major surface which each extend for the length and the width of the fibrous insulation blanket; the fibrous insulation blanket being separable by hand at and along one or more longitudinally extending lines, spaced apart from each other across the width of the fibrous insulation blanket, into a plurality of blanket sections of lesser width than the width of the fibrous insulation blanket; the one or more longitudinally extending lines where the blanket is separable longitudinally being spaced inward from lateral edges of the fibrous insulation blanket; the facing sheet comprising:

a sheet having a length and a width, the sheet having a first major surface and a second major surface which each extend for the length and the width of the sheet; the sheet having a first longitudinally separable means therein extending for the length of the sheet; the first longitudinally separable means being separable by hand along the length of the sheet; the first longitudinally separable means of the sheet being spaced inwardly from lateral edges of the sheet and being located in the sheet to be aligned longitudinally with a first of the longitudinally extending lines of the fibrous insulation blanket when the sheet is bonded to the fibrous insulation blanket whereby the fibrous insulation blanket with the sheet can be handled as a unit for insulating a cavity having a width about equal to the width of the fibrous insulation blanket or easily separated into blanket sections by hand at the first longitudinally extending line of the fibrous insulation blanket and the first separable means of the sheet for insulating a cavity having a lesser width than the width of the fibrous insulation blanket; and the first separable means comprising a first pair of tabs that are separable from each other and extend the length of the sheet.

2. The facing sheet according to claim 1, wherein:

the sheet has a second pair of tabs, adjacent the lateral edges of the first major surface of the sheet that extend the length of the sheet.

3. The facing sheet according to claim 1, wherein:

the first pair of tabs comprises a portion of the sheet double folded upon itself to form a Z-shaped pleat.

4. The facing sheet according to claim 3, wherein:

the sheet has a second pair of tabs, adjacent the lateral edges of the first major surface of the sheet that extend the length of the sheet.

5. The facing sheet according to claim 1, wherein:

the sheet has a second longitudinally separable means therein extending the length of the sheet; the second longitudinally separable means being separable by hand along the length of the sheet; the second longitudinally separable means being spaced inwardly from the lateral edges of the sheet, spaced laterally from the first longitudinally separable means, and being located in the sheet to be aligned longitudinally with a second of the longitudinally extending lines of the fibrous insulation blanket when the sheet is bonded to the fibrous insulation blanket whereby the fibrous insulation blanket with the sheet can be handled as a unit for insulating a cavity having a width about equal to the width of the fibrous insulation blanket or easily separated into blanket sections by hand at the first longitudinally extending line of the fibrous insulation blanket and the first separable means of the sheet or the second longitudinally extending line of the fibrous insulation blanket and the second separable means of the sheet for insulating a cavity having a lesser width than the width of the fibrous insulation blanket and the second separable means comprises a second pair of tabs that are separable from each other and extend the length of the sheet.

6. The facing sheet according to claim 5, wherein:

the sheet has a third pair of tabs, adjacent the lateral edges of the first major surface of the sheet that extend the length of the sheet.

7. The facing sheet according to claim 5, wherein:

the first pair of tabs comprises a first portion of the facing sheet double folded upon itself to form a first Z-shaped pleat and the second pair of tabs comprises a second portion of the facing sheet double folded upon itself to form a second Z-shaped pleat.

8. The facing sheet according to claim 7, wherein:

the sheet has a third pair of tabs, adjacent the lateral edges of the first major surface of the sheet that extend the length of the sheet.

* * * * *